United States Patent [19]

Seiler et al.

[11] Patent Number: 5,122,398
[45] Date of Patent: Jun. 16, 1992

[54] RECYCLABLE BUMPER SYSTEM

[75] Inventors: Erhard Seiler, Ludwigshafen; Klaus-Dieter Ruempler, Wachenheim; Norbert Jung, Lampertheim; Udo Haardt, Biblis; Rainer Henning; Juergen Hamprecht, both of Muenster, all of Fed. Rep. of Germany

[73] Assignee: BASF Aktiengesellschaft, Ludwigshafen, Fed. Rep. of Germany

[21] Appl. No.: 618,331

[22] Filed: Nov. 26, 1990

[30] Foreign Application Priority Data

Oct. 31, 1989 [DE] Fed. Rep. of Germany ....... 3936194

[51] Int. Cl.$^5$ ............................ B32B 1/00; B32B 3/26
[52] U.S. Cl. ...................................... 428/31; 428/71; 428/188; 428/319.7
[58] Field of Search ..................... 428/31, 71, 76, 188, 428/319.7

[56] References Cited

U.S. PATENT DOCUMENTS

| 3,493,257 | 2/1970 | Fitzgerald et al. | 428/71 |
| 4,598,001 | 7/1986 | Watanabe et al. | 428/31 |
| 4,931,339 | 6/1990 | Malcolm-Brown | 428/71 |

Primary Examiner—William J. Van Balen
Attorney, Agent, or Firm—William G. Conger

[57] ABSTRACT

A recyclable bumper system based on polypropylene comprises a bumper support A of glass fiber reinforced polypropylene, an energy-absorbing foam core B of foamed polypropylene and a tough shell C of EP-rubber modified polypropylene which may be coated, and can be recycled by mechanical comminution, extrusion and granulation, resulting in granules from which injection moldings having good mechanical properties can be produced.

3 Claims, 1 Drawing Sheet

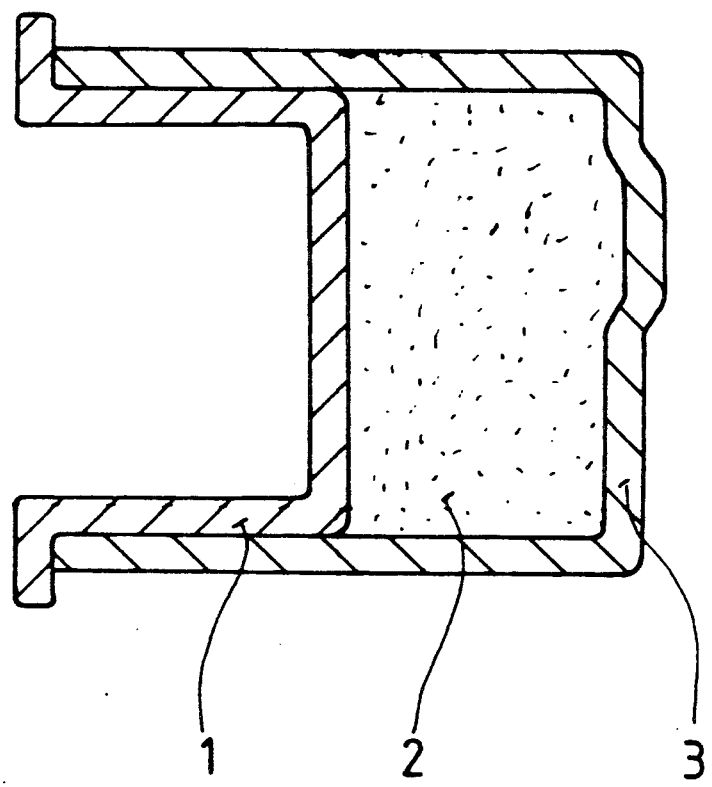

RECYCLABLE BUMPER SYSTEM

The constituent components of bumper systems, namely the support, the foam core and the shell, are increasingly made of plastics to save weight and hence lower fuel consumption. Various types of plastics have been found to be suitable for the components mentioned. In practice, the material used for the bumper support is in particular glass fiber reinforced polyester resin sheet molding compound (SMC), the material preferred for the energy-absorbing foam core is foamed polyurethane (PUR foam), and the impact-resistant plastics shell is made of polycarbonate/polybutylene terephthalate (PC/PBT) mixtures, polypropylene/ethylene-propylene diene monomer (PP/EPDM) mixtures and polyurethane (PUR-RIM).

There has been interest for some considerable time in the problem of recycling large plastics parts of automobiles, since the shredding of auto scrap produces appreciable amounts of mixed and hence hardly usefully recyclable plastics waste, which must be landfilled, while the metal scrap can be largely recycled.

Numerous trials have shown that plastics parts based on a uniform raw material are in principle recyclable. However, it is very complicated and expensive to separate for example a bumper system of PC/PBT shell, PUR foam core and SMC support into its components, which interfere greatly with one another in recycling. Another factor is that, even after successful separation, coated bumper shells, even when ground small and worked up via an efficiently homogenizing extruder, lead to a dramatic deterioration in the mechanical and optical properties of the recyclate owing to the hard coating residues.

U.S. Pat. No. 4,749,613 describes a bumper support made of fiber-reinforced thermoplastics wherein the reinforcing fibers used are laminates of unidirectionally oriented continuous fibers and random-laid fiber mats. The preferred thermoplastic is polypropylene. This bumper support can be combined with polyurethane foam and a polyurethane shell.

EP-A-97,504 recommends a foamed polypropylene of density 15–45 g/l for use as a core material for car bumpers. The materials mentioned as suitable for the bumper shell are polyurethane, polypropylene and polyethylene.

EP-A-174,483 recommends a foamed ethylene/propylene copolymer having a density of 47–180 g/l for use as a core material. The materials mentioned for the shell are polyurethane and a propylene copolymer.

It is an object of the present invention to develop an all plastic bumper system which is recyclable, even when coated, to give shaped articles having acceptable mechanical properties.

We have found that this object is achieved by the bumper system according to the present invention. It comprises a bumper support A formed from glass fiber reinforced polypropylene, an energy-absorbing foam core B formed from foamed polypropylene, and a tough, resilient shell C formed from rubber-modified polypropylene, with or without a coating. The bumper system is easy to remove from the scrapped car and is then fully recyclable by mechanical comminution, extrusion and granulation. It has been found here that the mechanical values measured on injection-molded test specimens are sufficiently high even when the bumper system had been covered with from 0.05 to 4% by weight of a coating. This is surprising in that it had to be expected that the notching effect of the paint particles would greatly reduce the toughness. This effect is in fact observed when a glass fiber free thermoplastic is used as bumper support but, surprisingly, not when glass fiber reinforced polypropylene is used.

DESCRIPTION OF THE DRAWING

The drawing shows the bumper system according to the present invention in diagrammatic form, where 1 denotes the support, 2 the foam core and 3 the shell.

The individual components of the system may be described as follows:

A. The bumper support accounts for 70–30% of the weight of the system. It comprises a glass fiber reinforced propylene polymer containing some unidirectionally oriented continuous fibers, the glass fiber content being at least 30% by weight, preferably 40–70% by weight, based on A. The preferred propylene polymer is the homopolymer. However, it may also contain up to 10% by weight of comonomers, for example ethylene, as copolymerized units or up to 20% by weight of ethylene/propylene rubber in admixture. Preference is given to isotactic polypropylene having a molecular weight $M_w$ of from 100,000 to 300,000 and a narrow molecular weight distribution. To improve the adhesion to the glass fibers, the polypropylene may contain 1–20% by weight of a carboxyl-grafted polypropylene or EPDM rubber or of a reactive silane, e.g. vinylsilane, methacryloylsilane or aminosilane, combined with an organic peroxide. The glass fiber component contains not only unidirectionally oriented continuous fibers but also random-laid fiber mats, which preferably are arranged in alternating layers and are needled together. The weight ratio of continuous fibers to random fibers is preferably within the range from 80:20 to 40:60. A preferred molding compound of this kind is described in EP-A-323,571. The bumper support is produced from the sheet molding compound by hot pressing. The support is in general from 3 to 25 mm in thickness.

B. The foam core accounts for 2–15% of the weight of the bumper system. It comprises a propylene polymer foam having a density of from 30 to 150 g/l preferably from 50 to 120 g/l. The propylene polymer can be a homopolymer, but preferably is a random copolymer with 2–10% by weight of ethylene or butene or a mixture of the two. The foam core is produced by pressing and welding foam particles together in a mold.

C. The bumper shell accounts for 28–73% of the weight of the system. It comprises a propylene polymer which has been impact modified with 25–65% by weight, based on C, of an ethylene/propylene rubber. The preferred form of the propylene polymer is again the homopolymer. It has been found that a relatively high rubber content is indispensable to avoid stress-whitening of the bumper shell. Preference is given to a minimum level of EP rubber of 35% by weight, in particular 40% by weight. In a preferred method of preparation, first propylene is homopolymerized from the gas phase, then a mixture of ethylene and propylene with or without a diene is added and polymerized in the presence of the preformed polypropylene, forming a reactor blend. Such a procedure is described in DE-A-3,827,565. The rubber-containing propylene polymer, to improve coating adhesion and to modify properties such as stiffness, heat resistance, shrinkage, etc., may contain up to 30% by weight of fillers, for example talc, chalk, kaolin or short glass fibers. Again, as with A, suitable adhesion promoters may be added to improve the adhesion between the filler and the propylene polymer and/or to increase the toughness. The soft, flexible bumper shell is preferably from 1.5 to 6 mm in thickness.

D. If the bumper has been coated, the coating accounts for 0.05–4%, perferably 0.01–2%, of its weight. It is basically possible to use any conventional automotive coating, preferably a flexible acrylate or polyurethane coating, which may contain the customary pigments.

The components A, B and C can be joined together by customary joining techniques, for example by welding at temperatures above the softening point of polypropylene or by bolting or clipping. The coating is applied to the bumper shell in a conventional manner. The bumper system meets very high standards in respect of shock resistance; for example, it can withstand an impact at a speed of up to 8 km/h without damage.

Given the right choice of materials for the individual components bearing in mind the above-described criteria, a recyclable system will be obtained. Recycling is effected by first mechanically comminuting the bumper, for example initially coarsely with cutting or impact mills, then finely with hammer or rotor mills. The comminuted material having a particle size of about 5–10 mm is melted and homogenized in a commercial high-shear extruder and then granulated. The granules can be used to produce injection moldings which, provided the starting materials were chosen correctly, have the following properties:

| | |
|---|---|
| Glass fiber content | at least 10% by weight |
| Tensile modulus of elasticity (DIN 53 455) | at least 2000 N/mm$^2$ |
| Yield stress (DIN 53 455) | at least 20 N/mm$^2$ |
| Impact toughness at −40° C. (DIN 53 453) | at least 10 kJ/m$^2$ |
| Notched impact strength at RT (DIN 53 453) | at least 5 kJ/m$^2$ |
| Heat resistance (ISO 75 B) | at least 125° C. |
| Median paint particle size, d$_{50}$ | <500 μm |

Preferably, the paint particles are smaller than 300 μm.

A material having these properties can be reused in various ways, for example in two-component injection molding for stiffening moldings, for engine compartment cowlings, for manufacturing film- or carpet-laminated door trim or trunk linings, for manufacturing cable ducts, air ducts and housings for headlights and rear lights, etc.

EXAMPLE 1

A glass mat reinforced polypropylene SMC comprising 55% by weight of a highly isotactic (isotacticity index>97%) controlled rheology (CR) polypropylene having a narrow molecular weight distribution and an MFI (230° C./2.16 kg)=70 g/10 min, 20% by weight of glass mat with randomly arranged glass fibers, and 25% by weight of aligned long glass fibers, in which the individual glass fiber layers have been needled together, is heated with IR radiators to about 250° C. and hot pressed in a bumper support form tool, causing the aligned glass fibers to become disposed horizontally within the support and thus strongly increasing the bending stiffness and strength of the support.

B. To produce a contoured polypropylene foam core, a polypropylene random copolymer containing 2.2% by weight of ethylene as randomly incorporated copolymerized units, having an MFI (230/2.16) of 8 g/10 min and being in the form of small granular particles 1.5 mm in diameter is foamed up with an aliphatic hydrocarbon to a density of 30 g/l. The foamed beads are then introduced into a mold, compacted and welded together with steam to produce a contoured foam core having a density of 80 g/l.

C. To produce a bumper shell from EP-rubber modified polypropylene, the procedure is as follows:

A cascade comprising two stirred reactors is used to produce in the gas phase an EP-rubber modified polypropylene having the following characteristics:

Ethylene content 28%
Ethylene/propylene rubber content 49% by weight
MFI (230/2.16)=10 g/10 min
Narrow molecular weight distribution (CR product)
The product is further modified in the discharging extruder by adding 0.5% by weight, based on the polymer, of a mixture of 3 parts by weight of UCC silane ® Ucarsil PC 2A and
1 part by weight of UCC silane ® Ucarsil PC 1B The product obtained has the following properties:

| | | |
|---|---|---|
| Yield stress | 12 N/mm$^2$ | (DIN 53 455) |
| Tensile modulus of elasticity | 450 N/mm$^2$ | (DIN 53 457) |
| Impact strength at −40° C. | no fracture | (DIN 53 453) |
| Izod notched impact strength at −40° C. | 40 kJ/m$^2$ | (ISO 180/4A) |

This product is used to produce, on a large-scale injection molding machine, a bumper shell in a bumper shell mold using a closing force of 1500 metric t (melt temperature 250° C., mold temperature 30° C., cycle time 3.5 min).

D. The bumper shell is coated as follows:
pretreatment by flaming
application of a 25 μm thick primer based on a chlorinated polyolefin (GCO1-7109 from BASF Lacke+Farben) drying at 80° C. for 15 minutes
application of a 40 μm thick topcoat based on polyurethane:
metallic basecoat FW 95 from BASF Lacke+Farben
clearcoat 2K-PUR-GK 01-0102 from BASF Lacke+Farben The four above-described components account for the following weight proportions of the bumper system:

| | |
|---|---|
| support | 46% by weight |
| foam core | 8% by weight |
| shell | 45% by weight |
| coating | 1% by weight |

The complete bumper system is comminuted in a beater mill down to pieces about 5-10 mm in size. To prevent electrostatic charge buildup on the foam particles in particular, a little water is injected into the mill (about 1% based on total weight).

In an adjoining wind sifter, the significantly lighter foam particles are separated off to make uniform metering into the compounding extruder possible at a later stage.

A conventional twin-screw extruder (ZSK 53 from Werner+Pfleiderer) equipped with 1 atmospheric and 1 vacuum devolatilizing means, is charged with the mixture of chopped support and chopped shell on the one hand and the chopped foam core on the other in the same mixing ratio as in the bumper system (92:8), and the mixture is melted, intimately kneaded and homogenized and extruded in the form of plastic strands. The throughput is 80 kg/h.

The granules obtained are injection molded into test specimens which are found to have the following properties:

| | |
|---|---|
| MFI (230/2.16) | 15 g/10 min |
| Glass fiber content | 20.6% by weight |
| Tensile modulus of elasticity | 3100 N/mm$^2$ |
| Yield stress | 30 N/mm$^2$ |
| Impact strength at $-40°$ C. | 13.5 kJ/m$^2$ |
| Notched impact strength (U notch) at RT | 9.2 kJ/m$^2$ |
| Heat resistance | 145° C. |
| $d_{50}$ of paint particles: | <250 μm |

EXAMPLE 2

Example 1 is repeated, except that the bumper shell is not coated.

The recyclate is found to have the following properties:

| | |
|---|---|
| MFI | 17 g/10 min |
| GF content | 20.4% by weight |
| Yield stress | 35 N/mm$^2$ |
| Tensile modulus of elasticity | 3000 N/mm$^2$ |
| Impact strength at $-40°$ C. | 15 kJ/m$^2$ |
| Notched impact strength (U notch) at RT | 10.5 kJ/m$^2$ |
| Heat resistance | 145° C. |

EXAMPLE 3

Example 1 is repeated, except for the following differences:

| |
|---|
| 32% by weight of support |
| 10% by weight of foam core |
| 57% by weight of shell |
| 1% by weight of coating |

The recyclate obtained has the following properties:

| | |
|---|---|
| MFI | 8.5 g/10 min |
| GF content | 14.2% by weight |
| Tensile modulus of elasticity | 2100 N/mm$^2$ |
| Yield stress | 21 N/mm$^2$ |
| Impact strength at $-40°$ C. | 11.5 kJ/m$^2$ |
| Notched impact strength (U notch) at RT | 9.0 kJ/m$^2$ |
| Heat resistance | 130° C. |
| $d_{50}$ of paint particles: | <250 μm |

EXAMPLE 4

Example 1 is repeated, except for the following differences: The complete bumper system, having been reduced to pieces about 10 mm in size, is subjected to wind sifting by means of a cyclone. This separates the components A, B and C, owing to their large density differences (density of A about 1.2, density of B about 0.08, density of C about 0.9 g/cm$^3$), with >90% efficiency. The additional fines <1.5 mm in size from the comminution stage (amounting to about 1-3% of the total), made up predominantly of glass fiber, is collected in the filter of the cyclone.

The extruder (of the same construction as in Example 1) is charged with components B and C separately via metering means (differential metering balance), and the resulting mixture is melted.

Component A and the fine dust are introduced into the melt of B+C via a commercial metering and plugging means at a point about 30% along the extruder, and the polymer content melts. In the remainder of the extruder all the components are intimately mixed.

This recyclate is found to have the following properties:

| | |
|---|---|
| MFI (230/2.16) | 14 g/10 min |
| Glass fiber content | 21.2% by weight |
| Tensile modulus of elasticity | 3900 N/mm$^2$ |
| Yield stress | 49 N/mm$^2$ |
| Impact strength at $-40°$ C. | 21 kJ/m$^2$ |
| Notched impact strength (U notch) at RT | 12.2 kJ/m$^2$ |
| Heat resistance HDT ISO 75 | 148° C. |
| $d_{50}$ of paint particles: | <250 μm |

We claim:

1. A recyclable bumper system based on polypropylene, comprising a bumper support A, an energy-absorbing foam core B and a tough, deformable bumper shell C which may be coated with a coating D, formed from
   A. 70-30% by weight of a glass fiber reinforced propylene polymer containing at least some unidirectionally oriented continuous fibers, the glass fiber content being not less than 30% by weight, based on A,
   B. 2-15% by weight of a propylene polymer foam having a density of from 30 to 150 g/l
   C. 28-73% by weight of a propylene polymer containing from 25 to 65% by weight, based on C, of an ethylene/propylene rubber, with or without D. 0.05–4% by weight of a conventional automotive coating.

2. A recyclable bumper system as claimed in claim 1, wherein component C is an ethylene/propylene rubber prepared by polymerization of ethylene and propylene in the presence of preformed polypropylene.

3. A recyclable bumper system based on polypropylene as claimed in claim 1, having after comminution, extrusion, granulation and injection molding into test specimens the following properties:

| | |
|---|---|
| Glass fiber content | not less than 10% by weight |
| Tensile modulus of elasticity (DIN 53 455) | not less than 2000 N/mm$^2$ |
| Yield stress (DIN 53 455) | not less than 20 N/mm$^2$ |
| Impact toughness at −40° C. (DIN 53 453) | not less than 10 kJ/m$^2$ |
| Notched impact strength at RT (DIN 53 453) | not less than 5 kJ/m$^2$ |
| Heat resistance (ISO 75 B) | not less than 125° C. |
| Median paint particle size, d$_{50}$ | <500 μm |

* * * * *